United States Patent
Kanai et al.

(10) Patent No.: US 12,523,635 B2
(45) Date of Patent: Jan. 13, 2026

(54) AUTOSAMPLER OF LIQUID CHROMATOGRAPH AND LIQUID CHROMATOGRAPH INCLUDING THE SAME

(71) Applicant: HITACHI HIGH-TECH CORPORATION, Tokyo (JP)

(72) Inventors: Daisuke Kanai, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 297 days.

(21) Appl. No.: 18/253,987

(22) PCT Filed: Dec. 8, 2021

(86) PCT No.: PCT/JP2021/045055
§ 371 (c)(1),
(2) Date: May 23, 2023

(87) PCT Pub. No.: WO2022/131091
PCT Pub. Date: Jun. 23, 2022

(65) Prior Publication Data
US 2023/0408459 A1 Dec. 21, 2023

(30) Foreign Application Priority Data

Dec. 16, 2020 (JP) .................................. 2020-208191

(51) Int. Cl.
*G01N 30/24* (2006.01)
*G01N 35/02* (2006.01)
*G01N 30/02* (2006.01)

(52) U.S. Cl.
CPC ............. *G01N 30/24* (2013.01); *G01N 35/02* (2013.01); *G01N 2030/027* (2013.01)

(58) Field of Classification Search
CPC .. G01N 30/24; G01N 35/02; G01N 2030/027; G01N 30/86; G01N 35/1095; G01N 2030/8809
See application file for complete search history.

(56) References Cited

U.S. PATENT DOCUMENTS

2009/0020429 A1    1/2009  Ozawa et al.
2011/0184658 A1*   7/2011  Maruyama ............. G01N 30/82
                                                      702/25
(Continued)

FOREIGN PATENT DOCUMENTS

JP    H08-313538 A    11/1996
JP    2009-042226 A    2/2009
(Continued)

OTHER PUBLICATIONS

International Preliminary Report on Patentability, mailed Jun. 29, 2023, for International Application No. PCT/JP2021/045055.
(Continued)

*Primary Examiner* — Tarun Sinha
(74) *Attorney, Agent, or Firm* — Baker Botts L.L.P.

(57) ABSTRACT

Provided is an autosampler of a liquid chromatograph that can manage a sample container even in a case where the throughput of a pretreatment unit exceeds the throughput of the autosampler.
An autosampler of a liquid chromatograph includes a plurality of sample aspiration nozzles that aspirates a sample from sample containers installed at respective sample aspiration points; a sample transfer means that transfers the sample containers to the respective sample aspiration points; and a retraction point where one of the sample containers is put into the autosampler and one of the sample containers collected from the sample aspiration points can be held.

3 Claims, 7 Drawing Sheets

(56) References Cited

U.S. PATENT DOCUMENTS

2016/0195564 A1    7/2016  Hewitson et al.
2016/0363604 A1*  12/2016  Yasui ................. G01N 35/1009
2017/0145373 A1    5/2017  Lianides et al.
2018/0267069 A1    9/2018  Katsumi et al.
2022/0074960 A1    3/2022  Kanamaru et al.
2022/0170956 A1    6/2022  Yasui et al.

FOREIGN PATENT DOCUMENTS

| JP | 2016-126019 A | 7/2016 |
| JP | 2016-170079 A | 9/2016 |
| WO | WO 2020/090159 A1 | 5/2020 |
| WO | WO 2020/217732 A1 | 10/2020 |

OTHER PUBLICATIONS

International Search Report, mailed Feb. 8, 2022, for International Application No. PCT/JP2021/045055.
Extended European Search Report, issued Oct. 25, 2024, for European Application No. 21906454.0.

* cited by examiner

| | | Time / s | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| SAMPLE TRANSFER MEANS | OPERATION | SAMPLE GRASP | | | | | | | | | | | | | | | | | | | | | | | | | | | | | | | | | | | | | |
| | | SAMPLE INSTALLATION | | | | | | | | | | | | | | | | | | | | | | | | | | | | | | | | | | | | | |
| | | ON MOVE | | | | | | | | | | | | | | | | | | | | | | | | | | | | | | | | | | | | | |
| | POSITION | SAMPLE TRANSFER POINT | | | | | | | | | | | | | | | | | | | | | | | | | | | | | | | | | | | | | |
| | | SAMPLE ASPIRATION POINT 1 | | | | | | | | | | | | | | | | | | | | | | | | | | | | | | | | | | | | | |
| | | SAMPLE ASPIRATION POINT 2 | | | | | | | | | | | | | | | | | | | | | | | | | | | | | | | | | | | | | |
| | | WASTE LIQUID ASPIRATION POINT | | | | | | | | | | | | | | | | | | | | | | | | | | | | | | | | | | | | | |
| | | RETRACTION POINT | | | | | | | | | | | | | | | | | | | | | | | | | | | | | | | | | | | | | |
| SAMPLE ASPIRATION MECHANISM 1 | OPERATION | WASHING | | | | | | | | | | | | | | | | | | | | | | | | | | | | | | | | | | | | | |
| | | SAMPLE ASPIRATION | | | | | | | | | | | | | | | | | | | | | | | | | | | | | | | | | | | | | |
| | | SAMPLE INTRODUCTION | | | | | | | | | | | | | | | | | | | | | | | | | | | | | | | | | | | | | |
| | | ON MOVE | | | | | | | | | | | | | | | | | | | | | | | | | | | | | | | | | | | | | |
| | POSITION | WASHING POINT | | | | | | | | | | | | | | | | | | | | | | | | | | | | | | | | | | | | | |
| | | SAMPLE ASPIRATION POINT | | | | | | | | | | | | | | | | | | | | | | | | | | | | | | | | | | | | | |
| WASTE LIQUID ASPIRATION MECHANISM | OPERATION | WASHING | | | | | | | | | | | | | | | | | | | | | | | | | | | | | | | | | | | | | |
| | | WASTE LIQUID ASPIRATION | | | | | | | | | | | | | | | | | | | | | | | | | | | | | | | | | | | | | |
| | | ON MOVE | | | | | | | | | | | | | | | | | | | | | | | | | | | | | | | | | | | | | |
| | POSITION | WASHING POINT | | | | | | | | | | | | | | | | | | | | | | | | | | | | | | | | | | | | | |
| | | WASTE LIQUID ASPIRATION POINT | | | | | | | | | | | | | | | | | | | | | | | | | | | | | | | | | | | | | |
| TRANSFER MECHANISM | | ON MOVE | | | | | | | | | | | | | | | | | | | | | | | | | | | | | | | | | | | | | |
| | POSITION | PRETREATMENT UNIT | | | | | | | | | | | | | | | | | | | | | | | | | | | | | | | | | | | | | |
| | | INSTALLATION UNIT | | | | | | | | | | | | | | | | | | | | | | | | | | | | | | | | | | | | | |

AUTOSAMPLER OF LIQUID CHROMATOGRAPH AND LIQUID CHROMATOGRAPH INCLUDING THE SAME

TECHNICAL FIELD

The present invention relates to an autosampler of a liquid chromatograph and a liquid chromatograph including the same.

BACKGROUND ART

A general autosampler (automatic sample injection device) of a liquid chromatograph aspirates a sample received from a pretreatment unit (device or person) with an aspiration nozzle, injects the sample into an injection port of an injection valve, and introduces the sample into a flow path system including a column. After the introduction of the sample, in order to reduce a carry-over, a needle, the injection valve, the injection port, and a flow path tube are thoroughly washed.

PTL 1 describes an autosampler of a liquid chromatograph, and discloses that "an automatic sampling and reaction system has a microreactor in fluidic communication with an external sampling valve. The external sampling valve is connected to a priming valve and can draw a sample from a reactor or a reactor stream. The microreactor is connected to a reagent valve and an injection valve. The reagent valve can draw a reagent from a reagent reservoir and discharge the reagent to the microreactor to react with the sample. The priming valve can draw a washing agent from a washing agent reservoir and discharge the washing agent to the external sampling valve to move the sample from the external sampling valve to the microreactor. The injection valve is in fluidic communication with a column or a detector and discharges a secondary sample into a solvent composition stream" (see abstract).

CITATION LIST

Patent Literature

PTL 1: JP2016-126019A

SUMMARY OF INVENTION

Technical Problem

In a case where a throughput of a pretreatment unit exceeds a throughput of an autosampler, a sample container is congested between the pretreatment unit and the autosampler. PTL 1 has not studied a countermeasure against such a case.

An object of the invention is to provide an autosampler of a liquid chromatograph capable of managing a sample container even in a case where the throughput of the pretreatment unit exceeds the throughput of the autosampler.

Solution to Problem

In order to solve the above problem, for example, a configuration described in claims is adopted.

The present application includes a plurality of means for solving the above problem, and an example thereof is an autosampler of a liquid chromatograph, including: a plurality of injection valves; and sample aspiration nozzles that are connected to respective injection ports of the plurality of injection valves and that aspirate a sample from sample containers installed at respective sample aspiration points; a sample transfer means that transfers the sample containers to the respective sample aspiration points; and a retraction point where the sample container put into the autosampler and the sample container collected from the sample aspiration points can be held.

Advantageous Effects of Invention

According to the invention, an autosampler of a liquid chromatograph capable of managing a sample container even in a case where a throughput of a pretreatment unit exceeds a throughput of an autosampler can be provided.

Problems, configurations, and effects other than those described above will be clarified by the following description of an example.

DESCRIPTION OF EMBODIMENTS

Hereinafter, an example will be described with reference to the drawings.

EXAMPLE

Figure 1:
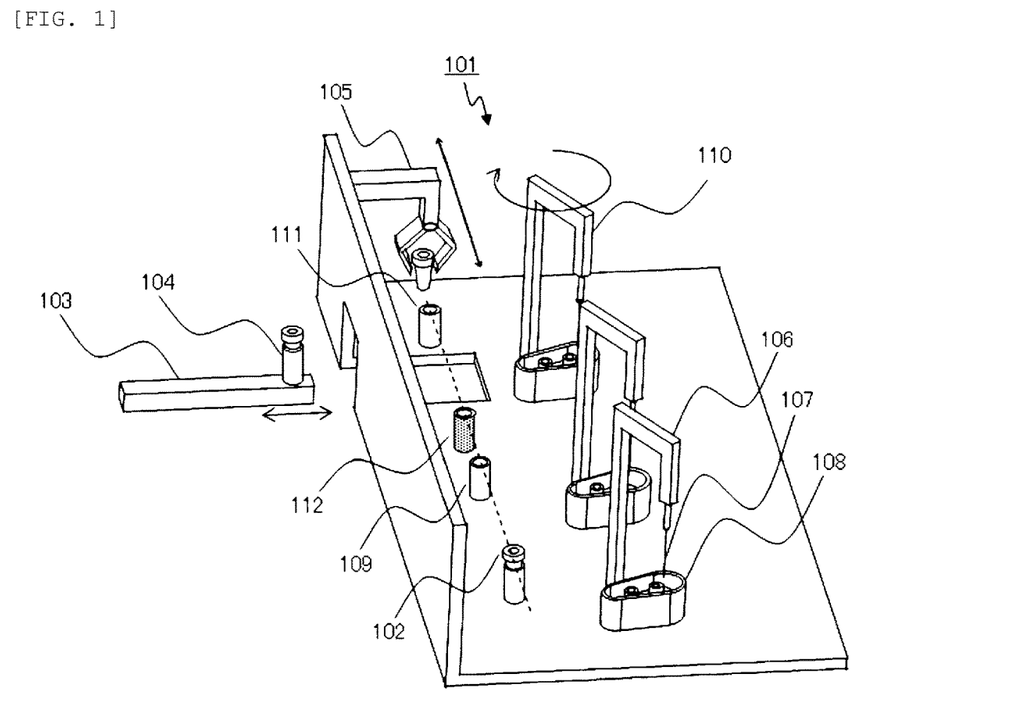
FIG. 1 is a plan view of an autosampler of a liquid chromatograph according to an example.

A device configuration of the invention will be described with reference to FIG. 1. FIG. 1 is a schematic view of an autosampler 101 of a liquid chromatograph according to an example. The autosampler 101 includes a sample container 102, a transfer mechanism 103, a sample transfer point 104, a sample transfer means 105, a sample aspiration mechanism 106, a sample aspiration nozzle 107, a washing tank 108, a sample aspiration point 109, a waste liquid aspiration mechanism 110, a waste liquid aspiration point 111, and a retraction point 112.

The sample container 102 is a container that holds an object to be measured represented by a sample alone or a mixture of a sample and a reagent.

The transfer mechanism 103 is a mechanism that introduces the sample container 102 from a pretreatment unit to the autosampler 101.

The sample transfer point 104 is a position in which the sample container 102 is held, and is a place in which the sample container 102 is placed when introduced into the autosampler 101 from the pretreatment unit. In the present example, the sample transfer point 104 is installed in the transfer mechanism 103. Therefore, it is possible to introduce the sample container 102 into the autosampler 101 by installing the sample container 102 containing a pretreated sample at the sample transfer point 104 and introducing the transfer mechanism 103 into the autosampler 101.

The transfer mechanism 103 and the sample transfer point 104 do not necessarily have to be formed as described above. For example, the sample container 102 may be provided at the sample transfer point 104 installed in the autosampler 101 using a human hand as the transfer mechanism 103.

The sample transfer means 105 is a mechanism that transfers the sample container 102 to another place. In the present example, a mechanism for gripping the sample container 102 is used, and a mechanism for pushing or pulling the sample container 102 out or in by an arm, a hook, or the like, or a non-contact sample transfer means using electromagnetic force or the like may be used.

The sample aspiration mechanism 106 is a mechanism that aspirates the sample in the sample container 102 using the sample aspiration nozzle 107 and transfers the sample to an analysis unit such as a column or a photometer.

The washing tank 108 is a mechanism for mainly washing an outer wall of the sample aspiration nozzle 107 before sample aspiration or in contact with the sample, and also has a function of discharging a waste liquid passed through the sample aspiration nozzle 107 to make an internal state of the sample aspiration nozzle 107 the same in each measurement or to wash inside of the sample aspiration nozzle 107. The mechanism will be described in detail with reference to FIG. 2.

The sample aspiration point 109 is a position for holding the sample container 102 and aspirating the sample by the sample aspiration mechanism 106.

The waste liquid aspiration mechanism 110 is a mechanism for aspirating and discarding the sample in the sample container.

The waste liquid aspiration point 111 is a position for holding the sample container 102 and aspirating the sample by the waste liquid aspiration mechanism 110.

The retraction point 112 is a position for holding the sample container 102 and receiving the sample container 102 that is no longer placed due to, for example, aspirating the sample in one sample container 102 by the plurality of sample aspiration mechanisms 106. When the autosampler 101 cannot confirm whether the sample transfer means 105 holds the sample container 102, for example, the autosampler 101 stops due to an error, loss of the sample can be prevented by installing the sample container 102 at the retraction point 112.

Figure 2:
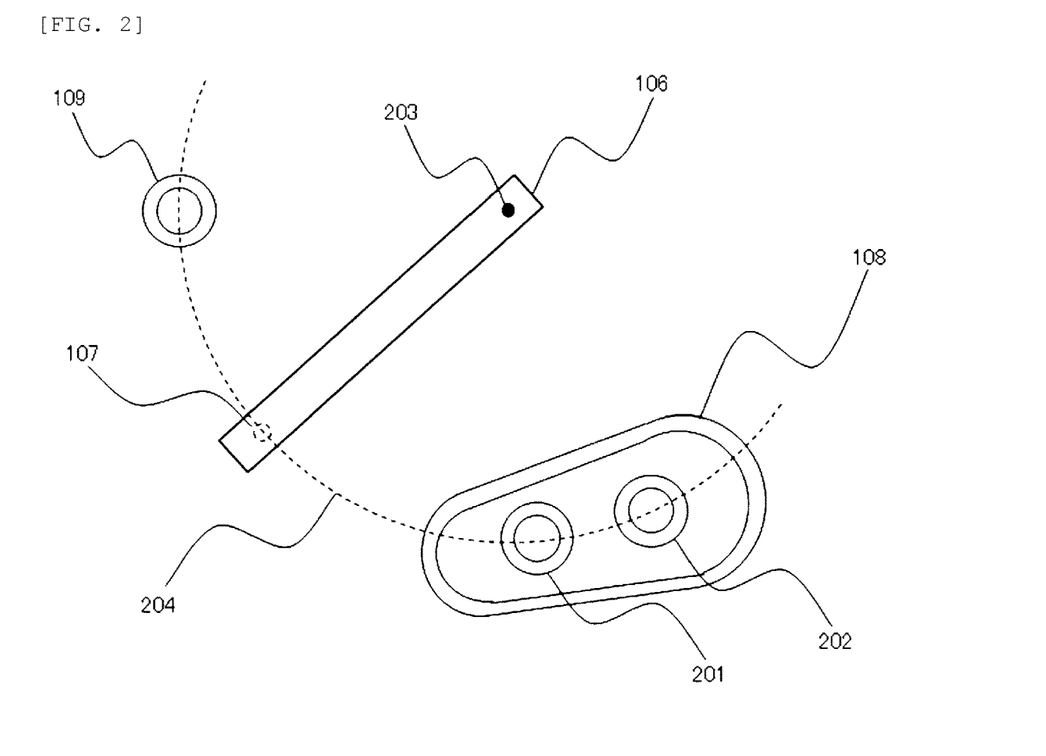
FIG. 2 is a schematic diagram illustrating a driving range of a sample aspiration mechanism and a washing tank.

A driving range of the sample aspiration mechanism 106 and the washing tank 108 will be described in detail with reference to FIG. 2. FIG. 2 is a schematic view focusing on the sample aspiration mechanism 106 and the washing tank 108. FIG. 2 includes an outside washing point 201 and a waste liquid discharge point 202.

The outside washing point 201 is a mechanism for mainly washing the outer wall of the sample aspiration nozzle 107 before the sample aspiration or in contact with the sample. In the present example, a washing point of a type in which the washing liquid flows out from below is used, and the washing liquid may be discharged to the sample aspiration nozzle. When a plurality of types of washing liquids are used, the number of the outside washing points 201 may be increased. The waste liquid discharge point 202 is a mechanism that discharges the waste liquid passed through the sample aspiration nozzle 107 to make the internal state of the sample aspiration nozzle 107 the same in each measurement or to wash the inside of the sample aspiration nozzle 107, and is connected to a waste liquid flow path. The sample aspiration nozzle 107 can rotate around a rotation center 203 of the sample aspiration nozzle. By arranging the sample aspiration point 109, the outside washing point 201, and the waste liquid discharge point 202 on a trajectory 204 of the sample aspiration nozzle, movement of the sample aspiration nozzle 107 on a plane to all positions that the sample aspiration nozzle 107 accesses in one cycle can be completed by one driving element provided in the sample aspiration mechanism 106.

A process of the invention will be described with reference to FIG. 1.

The sample container 102 is introduced into the autosampler 101 from the pretreatment unit using the transfer mechanism 103. The sample container 102 placed at the sample transfer point 104 is installed at the sample aspiration point 109 using the sample transfer means 105. After the sample aspiration nozzle 107 is washed in the washing tank 108, the sample is introduced from the sample container 102 at the sample aspiration point 109 into the analysis unit such as the column or the photometer through the sample aspiration nozzle 107. The sample container 102 is transferred to the waste liquid aspiration point 111 by the sample transfer means 105, and the waste liquid aspiration mechanism aspirates the sample in the sample container. The sample container 102 is transferred again to the sample transfer point 104 by the sample transfer means 105 and returned to the pretreatment unit by the transfer mechanism 103.

Figure 3:
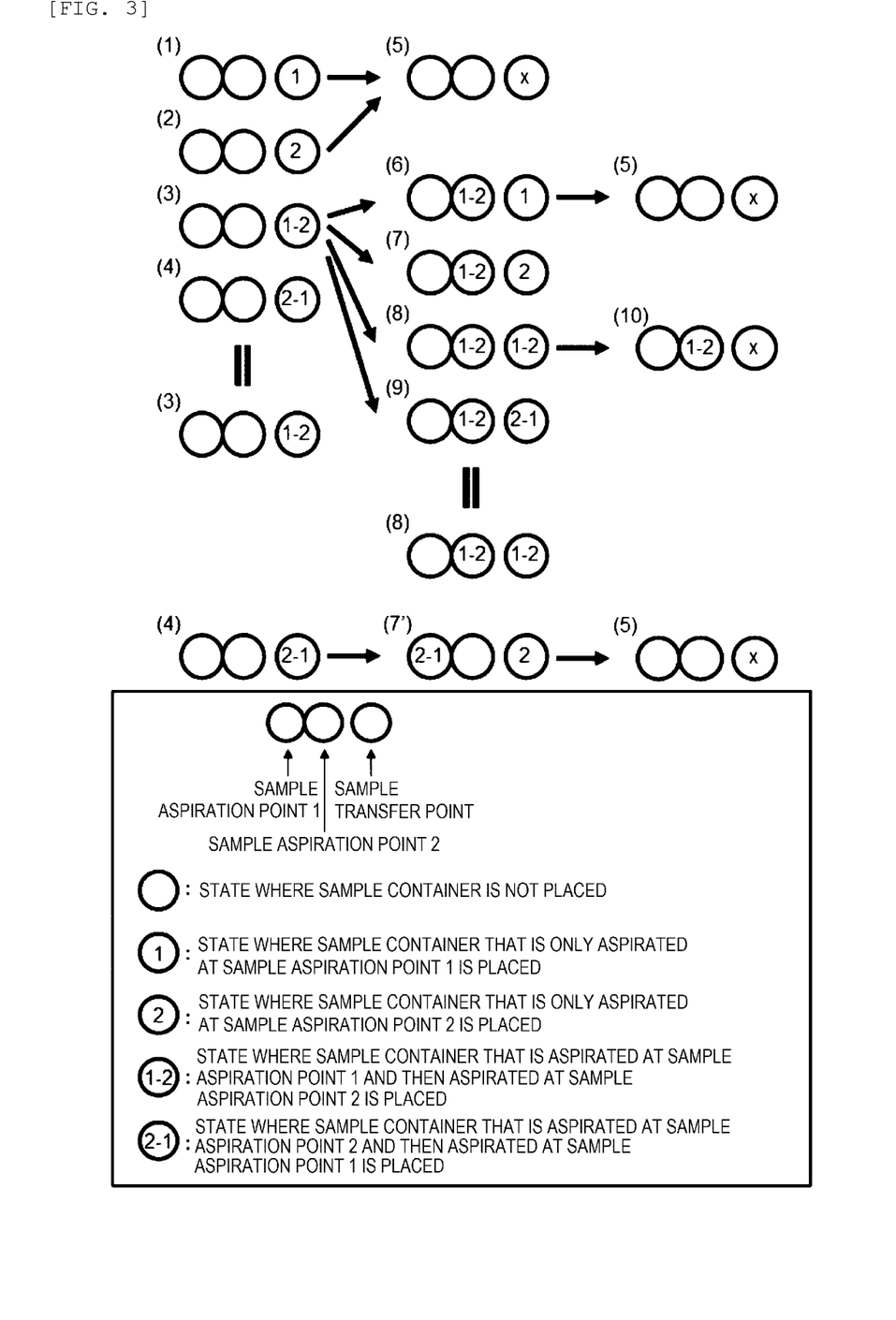
FIG. 3 is a diagram illustrating a sample supply pattern when there are two sample aspiration points.

A sample supply pattern when there are two sample aspiration points will be described with reference to FIG. 3. FIG. 3 is a diagram illustrating a position and information of the sample container 102 immediately before the sample container 102 is transferred from the sample transfer point 104 to the sample aspiration point 109.

At the start of the measurement, since there is no sample at the sample aspiration point, any one state of (1) to (4) in FIG. 3 is obtained. However, (3) and (4) may be regarded as the same because the order of measurement can be changed depending on a type of the sample to be supplied later. (1) and (2) return to an initial state of (5)=(1) to (4) at the start of a next cycle. (3) is in any one state of (6) to (9). (6) returns to the initial state of (5) at the start of the next cycle. (8) returns to the state of (10)=(6) to (9) at the start of the next cycle. (7) and (9) are in a state in which the sample container is placed at the sample aspiration point 2 and are a situation in which the sample container is about to be placed from the sample transfer point to the sample aspiration point 2. In order to avoid such a situation, when an interference occurs in an installation place at which "2" or "2-1" is placed next to the sample container of "1-2", scheduling for changing a measurement order is performed. Specifically, (9) is changed to a situation (8), and (7) is changed to (7') from the state of (4) instead of the state (3). (7') returns to the initial state of (5) at the start of the next cycle. As described above, a device can be controlled by creating four time charts of (1), (3), (6), and (8).

Figure 4:
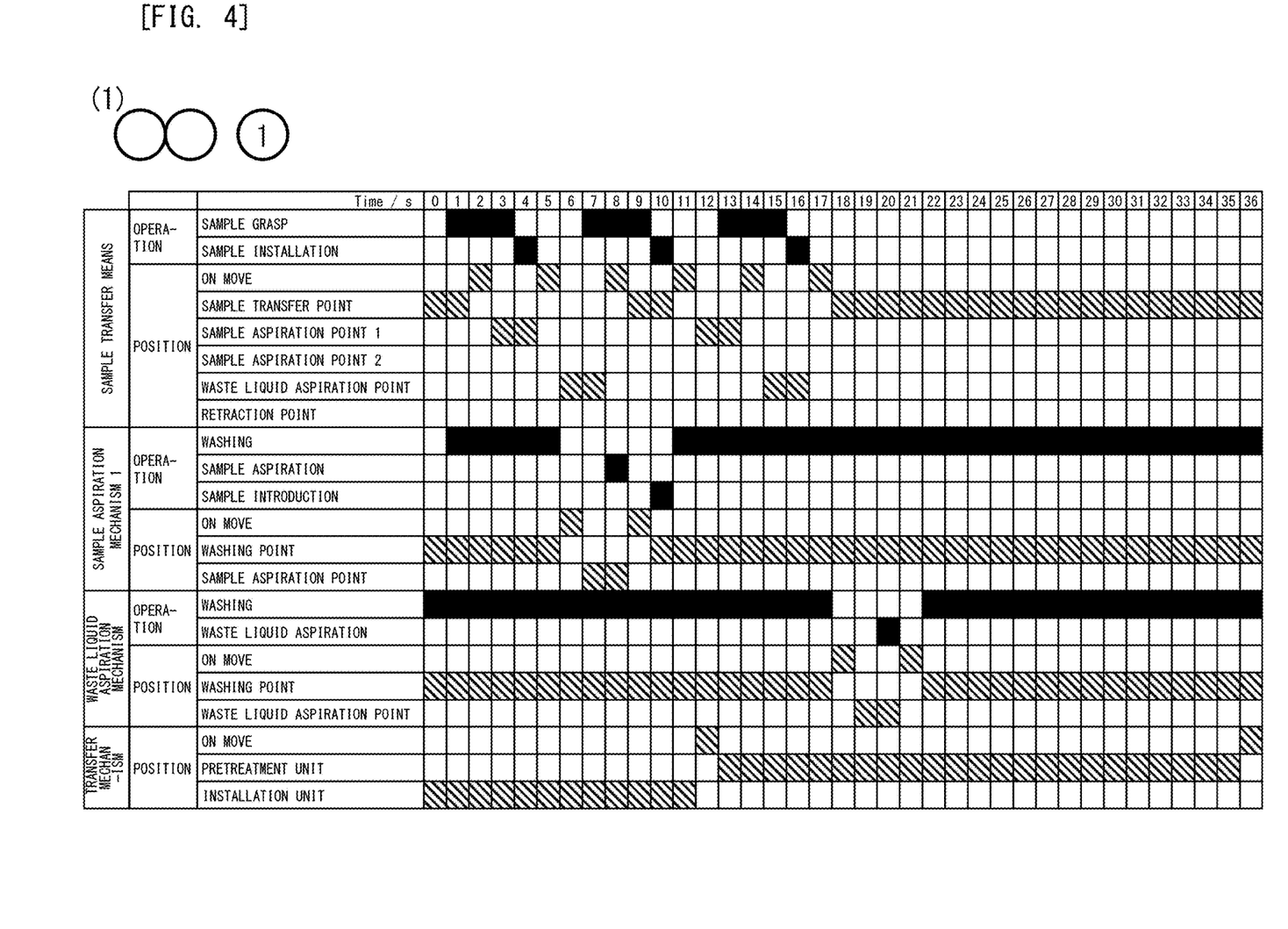
FIG. 4 is a time chart of the situation (1) of FIG. 3.

FIG. 4 illustrates a time chart of the situation (1) of FIG. 3. In the initial state, the sample transfer means is at the sample transfer point and does not grasp the sample container, the sample aspiration mechanism and the waste liquid aspiration mechanism are at a washing position, and the transfer mechanism is in a device unit in a state of holding the sample container.

The sample transfer means grasps the sample container at the sample transfer point at 1 s and moves to the sample aspiration point 1 at 3 s. The sample container is installed at 4 s and then moved to the waste liquid aspiration point. The sample aspiration mechanism 106 during washing accesses the sample aspiration point at 7 s, aspirates the sample at 8 s, and introduces the sample into the analysis unit at 10 s.

After the introduction, a washing operation is performed. Meanwhile, the sample transfer means moves to the waste liquid aspiration point at 6 s, grasps the sample container used in a previous cycle at 7 s, and installs the sample container at the sample transfer point at 10 s. The transfer mechanism moves the received sample container to the pretreatment unit and discards the sample container in the pretreatment unit. The sample transfer means moves to the sample aspiration point 1 at 12 s, grasps the sample container used for the measurement, and moves the sample container to the waste liquid aspiration point. Further, the waste liquid aspiration mechanism aspirates a residual liquid at 19 s.

Figure 5:
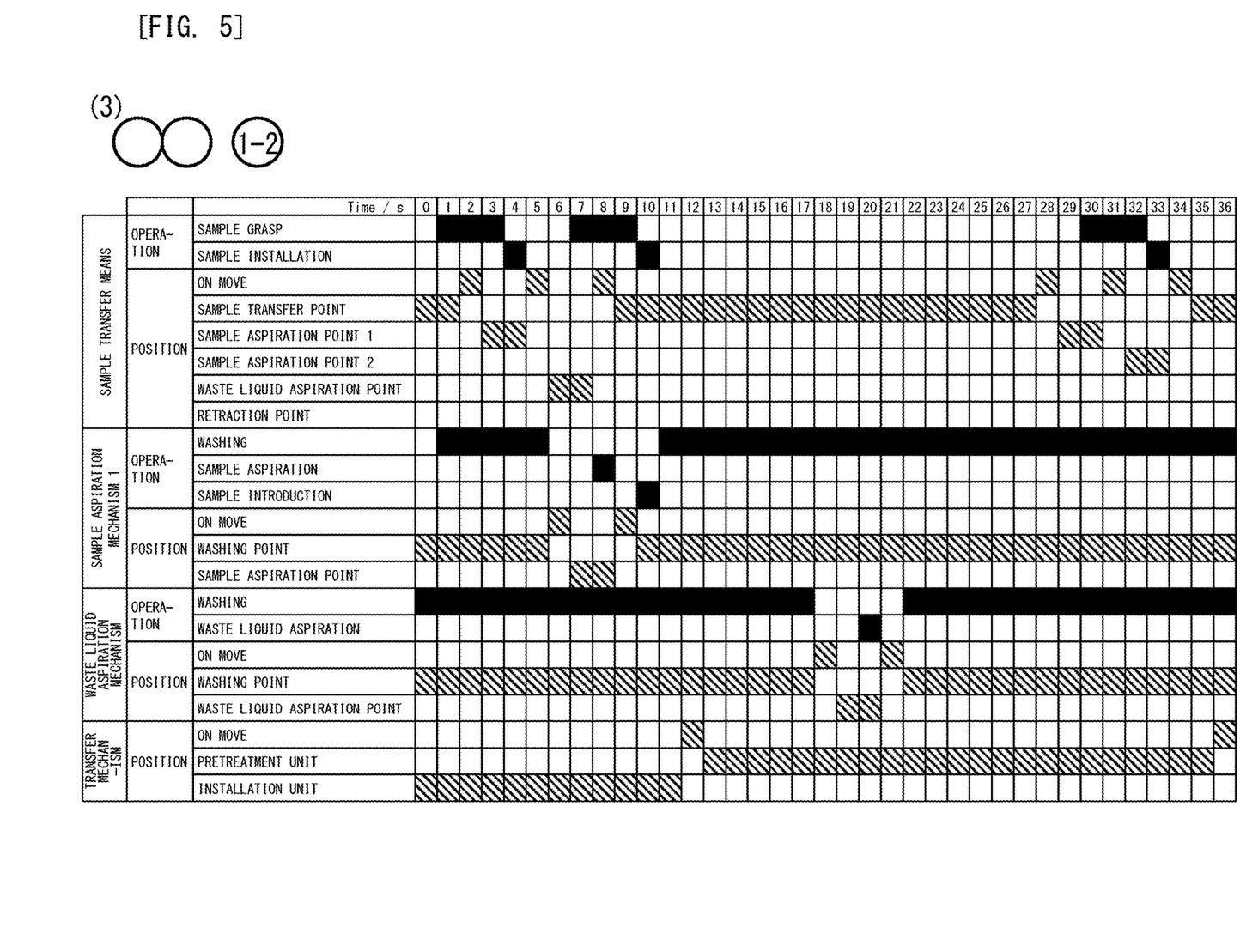
FIG. 5 is a time chart of the situation (3) of FIG. 3.

FIG. 5 illustrates a time chart of the situation (3) of FIG. 3. In FIG. 4, the sample container is transferred to the waste liquid aspiration point after the measurement is completed, and in this situation, the sample container is moved to the sample aspiration point 2.

Figure 6:
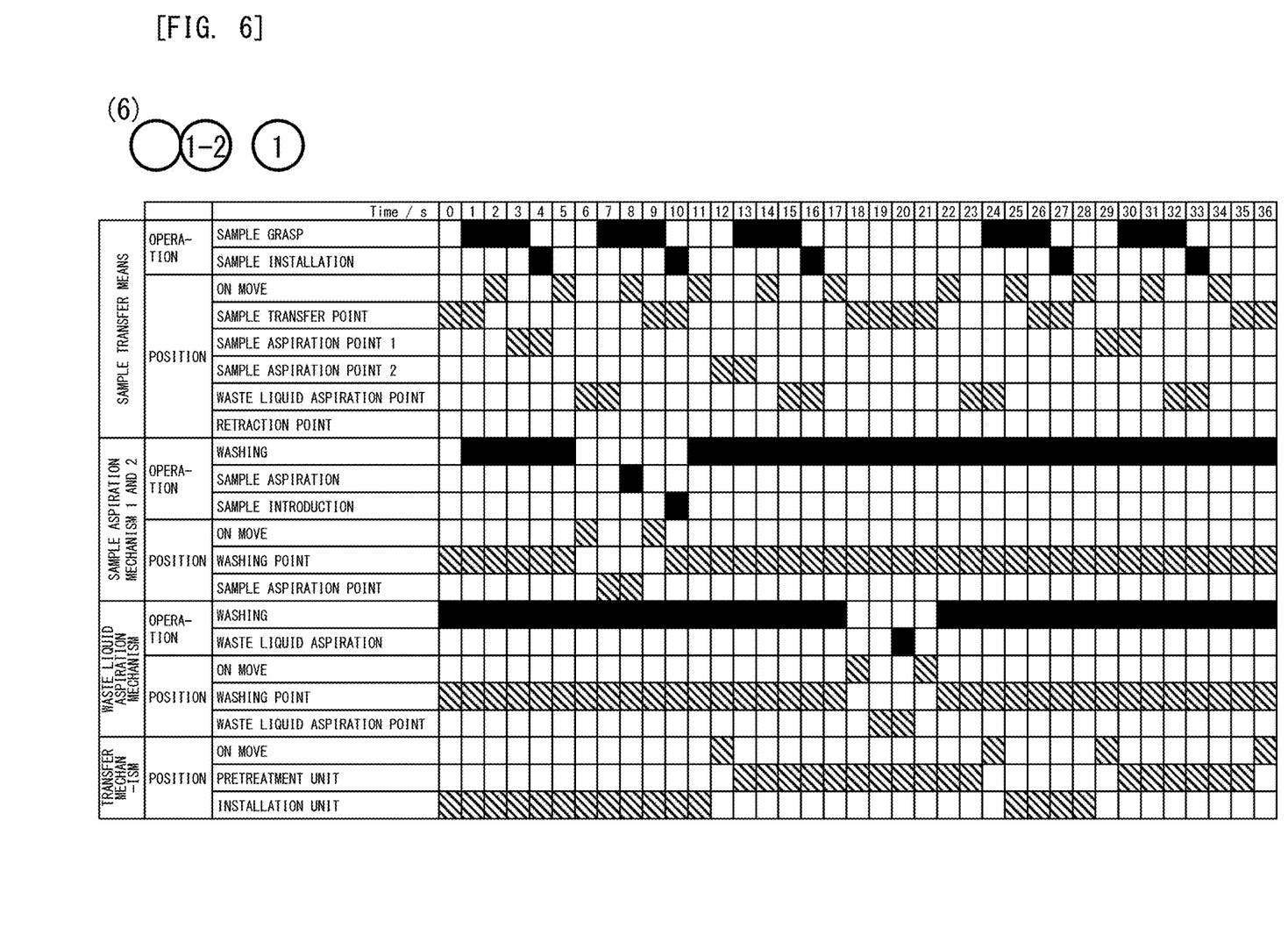
FIG. 6 is a time chart of the situation (6) of FIG. 3.
Figure 7:
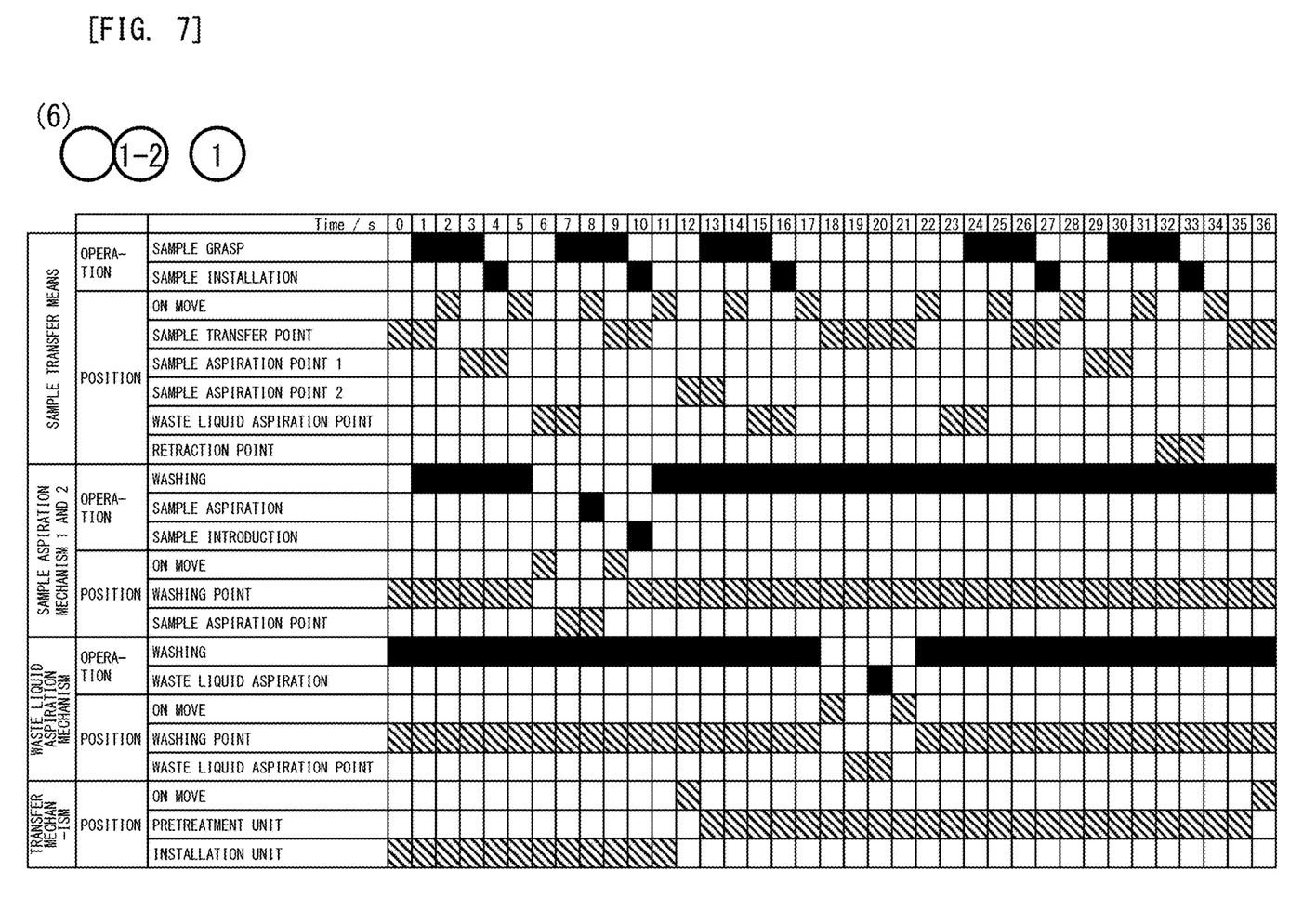
FIG. 7 is a time chart when only one sample container can be discarded in one cycle in the situation (6) of FIG. 3.

FIG. 6 illustrates a time chart of the situation (6) of FIG. 3. In the initial state, the sample container is placed at the sample aspiration point 2. In this situation, the sample container at the sample transfer point is installed at the sample aspiration point 1. After aspirating the sample, first, the sample container at the sample aspiration point 2 is transferred to the waste liquid aspiration point, the sample transfer point, and the pretreatment unit. Next, the sample container at the sample aspiration point 1 is transferred to the waste liquid aspiration point, the sample transfer point, and the pretreatment unit. In this case, the pretreatment unit can additionally discard the sample container. FIG. 7 is a time chart when there is no margin. Using the retraction point, one sample container is carried over in the next cycle.

Figure 8:
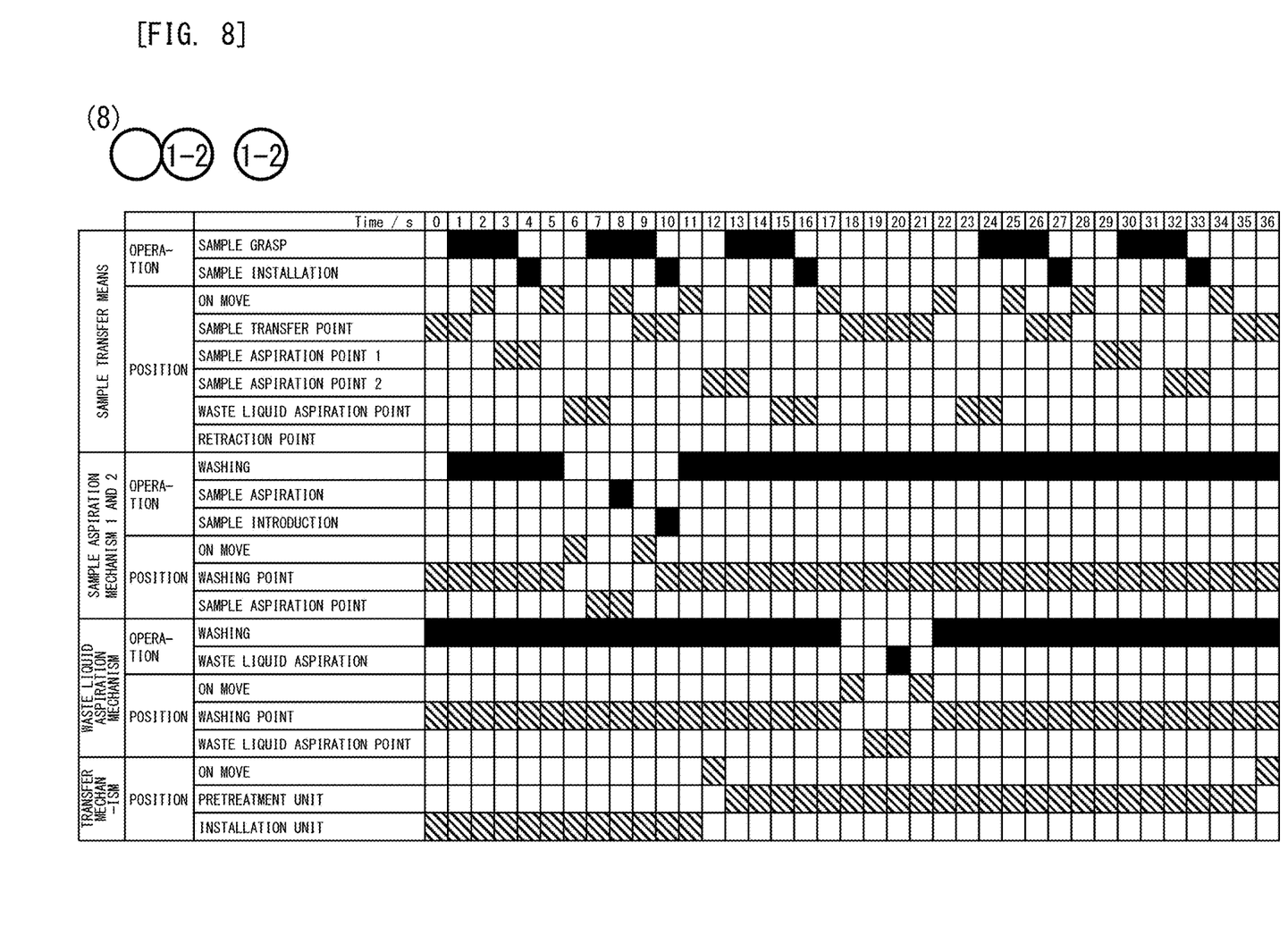
FIG. 8 is a time chart of the situation (8) of FIG. 3.

FIG. 8 illustrates a time chart of the situation (6) of FIG. 3. In FIG. 6, the sample container at the sample aspiration point 1 is transferred to the waste liquid aspiration point after the measurement is completed, and in this situation, the sample container is moved to the sample aspiration point 2.

The autosampler of the liquid chromatograph according to the present example includes a plurality of sample aspiration nozzles that aspirate a sample from sample containers installed at respective sample aspiration points; a sample transfer means (gripper) that transfers the sample containers to the respective sample aspiration points; and a retraction point where the sample container (received from the sample pretreatment unit) put into the autosampler and the sample container collected from the sample aspiration point are held. According to the present example, for example, when one sample is aspirated at a plurality of sample aspiration points to perform the measurement a plurality of times, the retraction point can be used as a place for placing a sample container until the sample container for which a test has been completed is returned to a discarding place (for example, the pretreatment unit). When it is impossible to confirm whether the sample transfer means holds the sample container, for example, at the time of occurrence of an error, it is possible to stop an operation without the loss of the sample and confirm the situation by performing an operation of installing the sample container at the retraction point.

Since the sample transfer means for moving the sample container to a delivery place with the pretreatment unit, the sample aspiration point, the waste liquid aspiration point, and the retraction point is provided, the sample can be automatically delivered to and from the pretreatment unit.

When the retraction point is used as the place for placing the sample container until the sample container for which the test has been completed is returned to the discarding place (for example, the pretreatment unit), and the device cannot confirm whether the sample transfer means holds the sample container, for example, the device stops due to the error, the sample transfer means may stop the operation without the loss of the sample and confirm the situation by performing the operation of installing the sample container at the retraction point.

The movement of the aspiration nozzle on the plane to all the positions that the aspiration nozzle accesses in one cycle can be completed by one driving element. Further, since the sample aspiration points are arranged on a straight line, an occupation area can be reduced as compared with that of arrangement of the sample aspiration point in a turn table type. The number of the driving elements of the sample transfer means can be reduced by one as compared with arrangement in which the driving elements are arranged in a grid pattern on the plane.

According to the invention, it is possible to satisfy "space-saving" in relation to a device area, "acceptance of throughput improvement of the pretreatment unit" and "prevention of throughput reduction due to a plurality of times of the measurement of one sample" in relation to a throughput performance, and "simplification of a structure" and "prevention of the loss of the sample" in relation to robustness.

The term "space-saving" mentioned herein refers to a structure in which an area to be used and the number of the driving elements are reduced by arranging the aspiration points on the straight line or by covering the places to be accessed by the aspiration nozzles with one driving element.

The term "prevention of throughput reduction due to a plurality of times of the measurement of one sample" mentioned herein means that the device can be operated to prevent reduction in the throughput even when a plurality of analyses are performed in one sample container. When a plurality of analyses are performed on one sample container, that is, when it is necessary to install the sample container in order at a plurality of sample aspiration points to perform the aspiration, a place for the sample container that is no longer placed is provided.

The term "simplification of a structure" mentioned herein refers to a structure in which the number of motors is reduced by arranging the aspiration points on the straight line and by covering the places to be accessed by the aspiration nozzles with one driving element.

The term "prevention of the loss of the sample" mentioned herein means that the operation can be stopped without the loss of the sample and the situation can be confirmed when the device cannot be confirmed whether the sample transfer means holds the sample container, for example, the device stops due to an error.

The autosampler 101 of the liquid chromatograph is used in the example, the invention is also applicable to an automatic analyzer or an analyzer for DNA and the like.

Further, the invention is not limited to the above example, and includes various modifications. For example, the above example has been described in detail for easy understanding of the invention, and the invention is not necessarily limited to those including all configurations described above.

REFERENCE SIGNS LIST

101: autosampler
102: sample container
103: transfer mechanism
104: sample transfer point
105: sample transfer means
106: sample aspiration mechanism
107: sample aspiration nozzle 108: washing tank
109: sample aspiration point
110: waste liquid aspiration mechanism
111: waste liquid aspiration point
112: retraction point
201: outside washing point
202: waste liquid discharge point
203: rotation center of sample aspiration nozzle
204: trajectory of sample aspiration nozzle

The invention claimed is:

1. An autosampler of a liquid chromatograph comprising:
a plurality of sample aspiration points at which sample containers can be placed;
a plurality of sample aspiration nozzles configured to aspirate a sample from sample containers respectively installed at the plurality of sample aspiration points;
a waste liquid aspiration point for aspirating and discarding the specimen in the specimen container by a waste liquid aspiration mechanism;
a sample transfer means configured to transfer the sample containers to the plurality of respective sample aspiration points;
a retraction point where one of the sample containers is put into the autosampler and one of the sample containers collected from the sample aspiration points can be held; and
wherein the plurality of sample aspiration points, the retraction point, and the waste liquid aspiration point are arranged on a straight line.

2. The autosampler of a liquid chromatograph according to claim 1,
wherein the sample aspiration point and a washing point are arranged at a position accessible by moving one driving element.

3. A liquid chromatograph comprising:
the autosampler of a liquid chromatograph according to claim 1.

* * * * *